Dec. 1, 1964 J. P. WATSON 3,159,365
SPRING FASTENING
Original Filed March 10, 1958
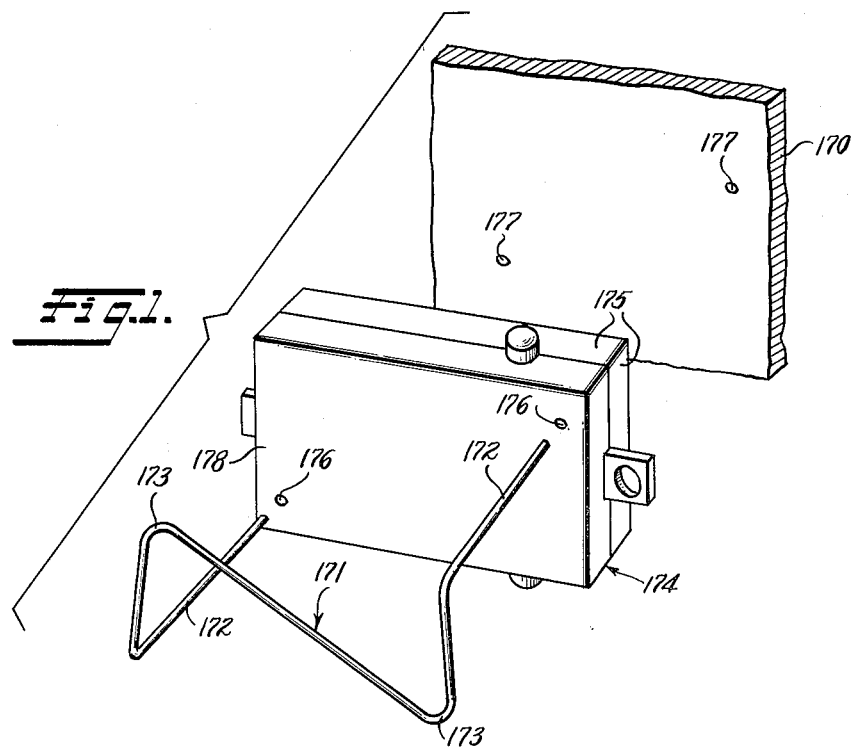
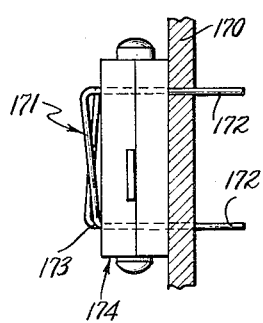
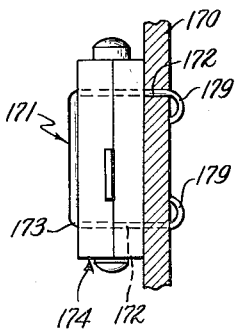
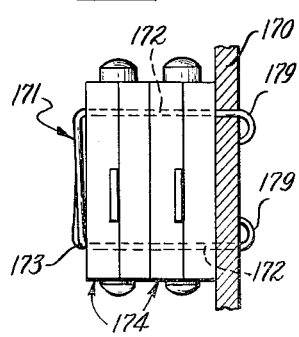
INVENTOR
James P. Watson

United States Patent Office 3,159,365
Patented Dec. 1, 1964

3,159,365
SPRING FASTENING
James P. Watson, Inglewood, Calif. (59 Waterway Road, Waterway Village, Jupiter, Fla.)
Original application Mar. 10, 1958, Ser. No. 720,303, now Patent No. 3,094,594, dated June 18, 1963. Divided and this application June 1, 1961, Ser. No. 120,854
1 Claim. (Cl. 248—27)

This invention relates to bi-stable mechanisms and particularly to a bi-stable electric switch.

It is an object of this invention to provide a bi-stable or snap acting switch well adapted for plug-in use whereby it may be readily employed with printed circuits.

Yet another object of this invention is to provide new and improved mounting means for mounting a mechanism or a plurality of stacked mechanisms of the character described firmly and securely on a wall, panel or the like.

A further object of this invention is to provide new and improved mounting means for mounting such mechanisms which provides resilient pressure at advantageous points of the mechanism to afford greater stability in the mounting and elimination of vibration or looseness therein without distortion of the housing or the mechanism.

In accordance with these and other objects which will become apparent hereinafter, preferred forms of the present invention will now be described with reference to the accompanying drawing wherein:

FIG. 1 is an exploded view, in perspective, of a mounting means for mounting a switch;

FIG. 2 is an end view in elevation, illustrating the preliminary step in the installation thereof;

FIG. 3 is an end view similar to FIG. 2, illustrating the finished installation thereof; and FIG. 4 is an end view similar to FIGS. 2 and 3, illustrating installation of a plurality of the latter switches.

This application is a division of applicant's prior co-pending application, Serial No. 720,303, filed March 10, 1958, titled Snap Acting Mechanism (which issued as Patent No. 3,094,594 on June 18, 1963).

Referring to FIGS. 1-4 inclusive, a form of mounting clip is illustrated which is specifically adapted for mounting a rectangular form of switch to a panel, or the like, indicated at 170.

The mounting clip, generally indicated by the numeral 171, comprises a unitary length of substantially resilient wire, preferably of stainless steel or the like, which is bent as illustrated to form a pair of spaced, substantially parallel ends or dowels 172 and a pair of oppositely-extending bight portions 173 angularly disposed relative to the dowels 172. The bight portions, together with an interconnecting portion form a generally Z-shaped configuration or, more specifically, interconnected oppositely extending bent portions whose apices or bights extend to opposite edges of the housing.

Each of the bight portions 173 is transversely bent in a plane substantially less than 90° relative to an adjacent end or dowel 172 to form resilient pressure points against the housing 174 when installed, and is preferably of a length suitable for reaching an opposite edge region of the switch housing 174. Pressure is thereby applied at the edges reinforced by the sidewalls 175 of the housing rather than in a central unsupported area thereof, as will hereinafter be described, thus preventing inward distortion of the housing which might otherwise result.

The mounting clip 171 is adapted to secure the housing 174 to the panel 170 by installing the clip in such manner that the ends or dowels 172 extend through apertures 176 provided adjacent diagonally opposed corners of the housing 174 and aligned apertures 177 of the panel, with the bight portions 173 overlying the outer sidewall 178 of the housing. The dowels 172 are preferably of sufficient length to extend substantially outwardly of the face of the panel 170 opposite the switch (as seen in FIG. 2) whereby the ends of the dowels may be grasped as by long-nosed pliers, or the like, to pull the dowels outwardly of the panel with sufficient force to create a pressure of the bight portions 173 on the housing 174. The ends of the dowels 172 are subsequently bent back on themselves to form inwardly-extending tabs 179 (FIG. 3) for securing the housing 174 to the panel 170 while retaining the resilient pressure of the bight portions 173 against the side wall 178 of the housing.

The apertures 176 are preferably located adjacent opposite corners of the housing which are supported by the side walls 175 of the housing 174.

In order to facilitate stacking of a plurality of housings 174 during the installation, the dowel portions 172 are preferably of sufficient length to extend through more than one housing, as illustrated in FIG. 4. Such additional length of dowel may be cut off to appropriate length if it is desired to mount only one such housing. A unitary mounting clip 171, as described above, advantageously eliminates necessity for screws which require specific lengths for secure installation, and being unitary, there is nothing to come loose. Furthermore, the Z-shaped configuration provides continual spring tension which compensates for any differential in expansion and contraction and provides added length for greater resiliency which is applicable to portions of the housing which are supported and reinforced by side walls. This instant form of mounting clip also provides a dowel type securement by extending through instead of around the housing.

While the instant invention has been shown and described herein in what is conceived to be the most practical and preferred embodiment, it is recognized that departure may be made therefrom within the scope of the invention, which is therefore not to be limited to the details disclosed herein but is to be accorded the full scope of the claim so as to embrace any and all equivalent methods and apparatus.

What is claimed is:

Mounting means for securing together a plurality of objects having spaced aligned openings therethrough, said mounting means comprising; a single length of spring wire formed to define substantially straight parallel free end portions spaced apart a predetermined distance; intermediate portions extending from corresponding inner ends of said end portions and extending obliquely toward the free ends of said end portions and on respectively opposite sides of a plane containing said end portions; and a central portion joining the outer ends of said intermediate portions whereby the junctures of said intermediate and central portions may resiliently bear on one of said objects to thereby provide four pressure points when said end portions are secured in said aligned openings.

References Cited in the file of this patent
UNITED STATES PATENTS

| | | |
|---|---|---|
| 2,263,039 | Jorgensen | Nov. 18, 1941 |
| 2,449,646 | Emde | Sept. 21, 1948 |
| 2,778,930 | Harrington | Jan. 22, 1957 |
| 2,788,187 | Cookson | Apr. 9, 1957 |
| 2,790,961 | Del Camp | Apr. 30, 1957 |
| 2,879,977 | Trought | Mar. 31, 1959 |